United States Patent [19]
Noe et al.

[11] Patent Number: 5,715,136
[45] Date of Patent: Feb. 3, 1998

[54] REMOVABLE/ADJUSTABLE DIGITAL DISPLAY ACCESSORY FOR COMPUTERS

[75] Inventors: William R. Noe, Oliver Springs; Mario A. Woods, Jr., Harriman, both of Tenn.

[73] Assignee: InTime Products LLC, Harriman, Tenn.

[21] Appl. No.: 643,864

[22] Filed: May 7, 1996

[51] Int. Cl.⁶ .................. G06F 1/16; H05K 7/14
[52] U.S. Cl. .................................................. 361/681
[58] Field of Search ............... 40/448; 364/708.1; 361/681, 683; 349/58

[56] References Cited

U.S. PATENT DOCUMENTS

| | | | |
|---|---|---|---|
| 4,422,728 | 12/1983 | Andreaggi | 349/60 |
| 4,514,920 | 5/1985 | Shafir et al. | 40/448 |
| 4,584,786 | 4/1986 | Georgopulos | 40/448 |
| 4,971,563 | 11/1990 | Wells, III | 439/61 |
| 5,227,957 | 7/1993 | Deters | |
| 5,248,193 | 9/1993 | Schlemmer | 312/223.2 |
| 5,408,385 | 4/1995 | Fowler et al. | 361/784 |
| 5,450,221 | 9/1995 | Owen et al. | 361/681 X |
| 5,495,390 | 2/1996 | Yu | 361/683 |

*Primary Examiner*—Michael W. Phillips
*Attorney, Agent, or Firm*—Pitts & Brittian, P.C.

[57] ABSTRACT

A removable/adjustable digital display accessory (10) for computers (60) for displaying a digital readout indicative of the current operating speed of the processor incorporated in a personal computer (60). The accessory (10) is designed for being removably secured to the cover (64) of a personal computer case (62) within an otherwise unused drive slot (66) defined by the cover (64). The accessory (10) is adapted to be installed in lieu of a cover plate (68) in the cover (64). The accessory (10) includes a base plate (12) and at least a digital display unit (26) having a digital display (28). The digital display unit (26) is provided for indicating the current processor speed and is carried on the back of the base plate (12). A turbo indicator (34) and a hard disk drive indicator (36) are also carried by the base plate (12). The accessory (10) may also be provided with a date and time clock (38) for continual display of the date and time. A plurality of signal strength indicators (40) may also be provided for indicating the strength of the electrical signal being delivered to a like number of components such as the hard disk drive, the RAM, the processor, a printer, and an auxiliary device. Further, the accessory (10) may be provided with a reset switch (44) and a turbo switch (46). A face plate (48) is secured to the base plate (12) in a conventional manner to cover each of the digital display unit (26) and turbo and hard disk drive indicators (34,36). A securement device (54) is provided for securing the accessory (10) to the cover (64) of the computer (60).

20 Claims, 3 Drawing Sheets

TO HARD DISK DRIVE    TO MOTHERBOARD    TO POWER SUPPLY

REMOVABLE/ADJUSTABLE DIGITAL DISPLAY ACCESSORY FOR COMPUTERS

TECHNICAL FIELD

This invention relates to the field of personal computers. More specifically, the present invention relates to a removable and adjustable display device for a personal computer for displaying at least the operating speed of the computer.

BACKGROUND ART

In the field of personal computers, it is well known that advancements are being continually made. Processors are being made to operate at faster speeds and are being made to handle more information at one time. For example, recent history shows a conventional personal computer processing eight (8) bits of information at speeds of eight (8) or sixteen (16) MHZ. Currently, personal computers process thirty-two (32) bits at speeds in excess of two hundred (200) MHZ A resulting problem in such advancements is the difficulty in developing and producing software which is compatible with various capacity computer systems.

In order to overcome problems due to incompatible computer processors and software, many personal computers have been provided with a feature often referred to as "turbo", which may be inactivated to operate the processor at one-half of the rated speed. In order to indicate to the user of the computer the current operating speed, some personal computers have been provided with a case having a digital display integrated within the case front. The digital display typically indicates when the computer is being operated in "turbo" mode, and the current processor operating frequency. For example, a processor having a rated operating speed of 66 MHZ in turbo mode will display "66". When the turbo feature is deactivated, the processor will operate at 33 MHZ and the display will read "33". Other features associated with many conventional digital displays include turbo and reset switches, a turbo indicator light for indicating when turbo has been engaged, a hard drive indicator light for indicating when a hard drive is being accessed, and a power light to indicate when power is being supplied to the processor. However, such displays are, as indicated above, integrated with the case cover. Such devices are not removable in that removal thereof would yield an opening in the case front that is not of standard size. Therefore, removal of conventional digital displays in personal computer case covers would leave an opening that cannot be easily covered.

The integrated digital display creates at least two problems that are not easily overcome with conventional methods or devices. First, integrated digital displays elevate the cost of the cases, and thus the cost of the computer. Second, replacement of the digital display upon failure thereof is both difficult and expensive. Because most computer cases vary one from the other, digital displays are likewise unique to particular cases. Therefore, replacement of a digital display is complicated in that a particular model of digital display would be required in order to achieve a proper fit and aesthetics. For those computers built using a case not having an integrated digital display device, there are no conventional devices available to install into the case.

Two conventional types of cases are indicated in U.S. Pat. Nos. 4,971,563 issued to W. M. Wells, III, and 5,227,957 issued to J. B. Deters. Again, neither of these devices indicate nor teach a removable digital display for viewing the operating speed of the processor.

Therefore, it is an object of this invention to provide a means for digitally display the operating speed of a personal computer processor.

It is another object of the present invention to provide such a device which is removable from the face cover of the personal computer ease and adjustable to display the appropriate speed for the associated processor.

Still another object of the present invention is to provide such a device which may be readily received on the face of any conventional computer face within a preexisting hard drive or floppy drive bay.

DISCLOSURE OF THE INVENTION

Other objects and advantages will be accomplished by the present invention which serves to display a digital readout indicative of the current operating speed of the processor incorporated in a personal computer. Moreover, the present invention is designed for being removably secured to the cover of a personal computer case within an otherwise unused drive slot defined by the cover, thereby allowing removability for various purposes, including replacement, restructuring of the computer, or any other purpose.

The removable/adjustable digital display accessory for computers, or accessory, of the present invention is adapted to be installed in lieu of a cover plate in the cover of a computer case. The accessory includes a base plate dimensioned to be received within the opening defined on the computer housing cover. A digital display unit having a digital display is provided for indicating the current processor speed and is carried on the back of the base plate. A turbo indicator and a hard disk drive indicator are also carried by the base plate. The turbo indicator is illuminated when the processor is being used in the "turbo" mode. The hard disk drive indicator is illuminated when power is delivered to the hard disk drive, i.e., when data is being retrieved from or written to the hard disk drive. The accessory may also be provided with a date and time clock for continual display of the date and time. The accessory may also be provided with a plurality of signal strength indicators for indicating the strength of the electrical signal being delivered to a like number of components such as the hard disk drive, the RAM, the processor, a printer, and an auxiliary device. Further, the accessory may be provided with a reset switch and a turbo switch. The reset switch is used to restart the computer without powering off the computer. The turbo switch is used for toggling the "turbo" mode ON and OFF.

A face plate is secured to the base plate to cover each of the digital display unit and turbo and hard disk drive indicators. The face plate is fabricated from an at least translucent material such that viewing of the various indicators is allowed. The face plate also serves to prevent foreign matter from entering the computer through any gaps that may be formed between one of the indicators and its respective opening defined in the base plate. The face plate is secured to the base plate in a conventional manner such as by conventional screw-type fasteners at each corner thereof, ultrasonic welding, or gluing.

A securement device is provided for securing the accessory to the cover of the computer. A pair of tabs is carried by the base plate at each end thereof The tabs are configured in a conventional manner to simulate the securement tabs carried by the cover plate which is removed for replacement by the accessory.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
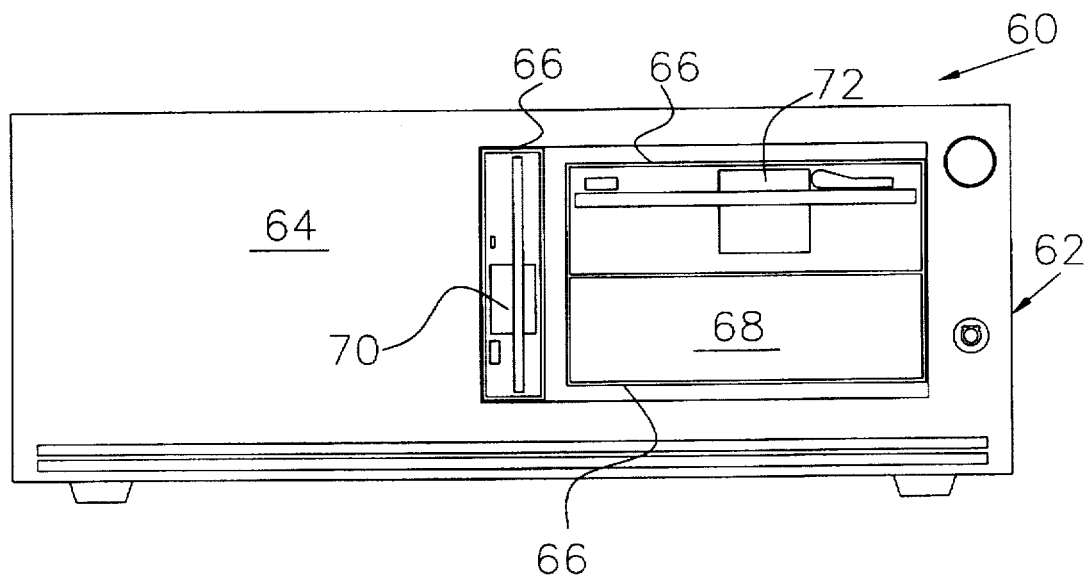
FIG. 1 is a front elevation view of a prior art case front of a personal computer.

A removable/adjustable digital display accessory for computers incorporating various features of the present invention is illustrated generally at 10 in the figures. The removable/adjustable digital display accessory for computers, or accessory 10 is provided for displaying a digital readout indicative of the current operating speed of the processor incorporated in a personal computer 60. Moreover, in the preferred embodiment the accessory 10 is designed for being removably secured to the cover 64 of a personal computer case 62 within an otherwise unused drive slot opening 66 defined by the cover 64, thereby allowing removability of the accessory 10 for various purposes, including replacement, restructuring of the computer 60, or any other purpose.

As illustrated in FIG. 1, prior art computers 60 are housed within cases 62 having a front cover 64. The cover 64 defines a plurality of openings 66 for receiving various types of drives. For example, the illustrated cover 64 define openings 66 for accessing a 3.5" drive 70 and two 5.25" drives 72. In the illustrated embodiment, a 3.5" floppy drive 70 and a 5.25" floppy drive 72 are used, with a 5.25" drive opening 66 being unused. The unused opening 66 is provided for future modification of the computer 60. In order to reduce the mount of dust and other foreign matter from entering the computer case 62, a cover plate 68 is secured to the cover 64. Conventionally, the cover plate 68 is configured to fit within the perimeter of the access opening 66 and is secured to the cover 64 by means of a plurality of deformable, resilient tabs (not shown). Due to the uniformity of size specifications between manufacturers, all cover plates 68 are substantially similar in size. Standard 3.5" drives 70 are dimensioned to be 4.0" wide and 1.0" high, while standard 5.25" drives 72 are dimensioned to be 5.75" wide and 1.75" high. Typically, cover plates 68 are left in place until the user chooses to rearrange the computer 60 or upgrade the computer 60 to include another drive, such as another 5.25" floppy drive 72, a tape backup drive (not shown), or a CD-ROM drive (not shown).

Figure 2:
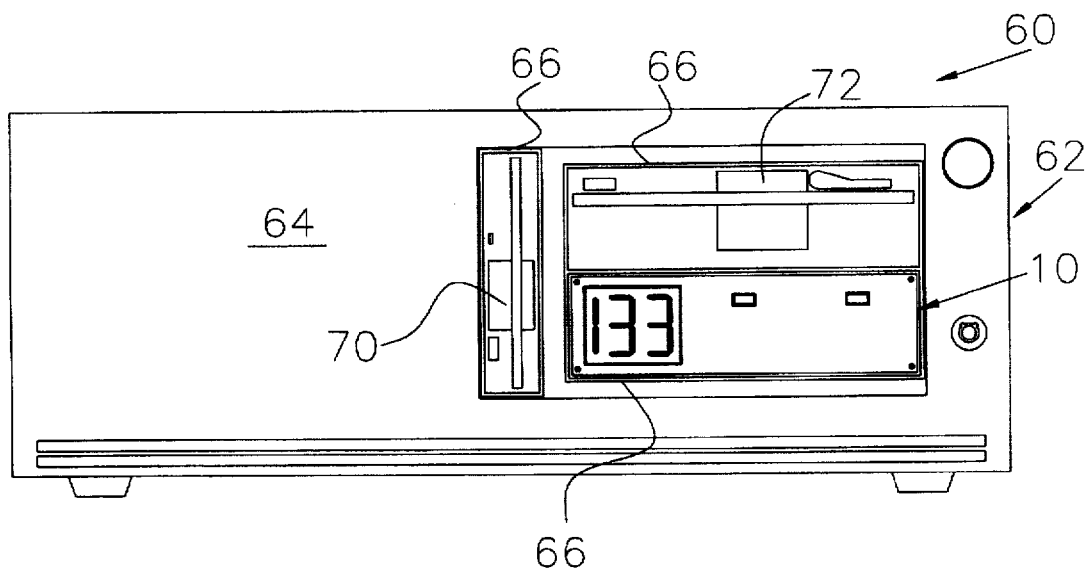
FIG. 2 is a front elevation view of a case front for a personal computer to which is secured a removable/adjustable digital display accessory for computers made in accordance with several features of the present invention.

As illustrated in FIG. 2, the accessory 10 of the present invention is adapted to be installed in lieu of a cover plate 68. As more clearly illustrated in FIG. 3, the accessory 10 of the preferred embodiment includes a base plate 12 dimensioned to be received within the opening 66 defined on the computer housing cover 64. A digital display unit 26 having a digital display 28 is provided for indicating the current processor speed and is carried on the back of the base plate 12.

A window 18 is defined in the base plate 12 for viewing the digital display 28. In the illustrated embodiment, the digital display 28 is capable of displaying processor speeds of up to 199 MHZ. One digital display unit 26 found to be suitable for use in the present invention is Model No. SFI-930 manufactured by Macase. However, it will be understood that other digital display units 26 may be incorporated to display any number of digits to display processor speeds greater than 200 MHZ.

A turbo indicator 34 and a hard disk drive indicator 36 are also carried by the base plate 12. Indicator windows 20 are defined by the base plate 12 for viewing of the turbo and hard disk drive indicators 34,36. In the illustrated embodiment, the turbo and hard disk drive indicators 34,36 are LED's. The turbo indicator 34 is illuminated when the processor is being used in the "turbo" mode. The hard disk drive indicator 36 is illuminated when power is delivered to the hard disk drive, i.e., when data is being retrieved from or written to the hard disk drive.

A face plate 48 is secured to the base plate 12 to cover each of the digital display unit 26 and turbo and hard disk drive indicators 34,36. The face plate 48 is fabricated from an at least translucent material such that viewing of the various indicators 26,34,36 is allowed. The face plate 48 also serves to prevent foreign matter from entering the computer 60 through any gaps that may be formed between one of the indicators 26,34,38 and its respective opening 18,20 defined in the base plate 12. In the preferred embodiment, the face plate 48 is fabricated from a tinted, transparent material such that glare from ambient light sources is reduced, thus allowing maximum viewing of the various indicators 26,34,36. The face plate 48 is secured to the base plate 12 in a conventional manner. In the illustrated embodiment, the face plate 48 is secured to the base plate 12 using conventional screw-type fasteners 52 at each corner thereof. However, it will be understood that the face plate 48 may be secured to the base plate 12 using ultrasonic welding, gluing, or any other conventional manner.

Figure 3:
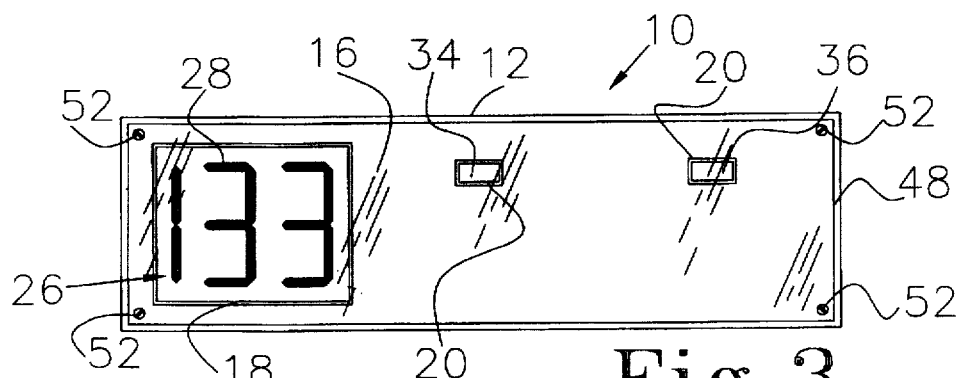
FIG. 3 is a front elevation view of the removable/adjustable digital display accessory for computers illustrated in FIG. 2.
Figure 4:
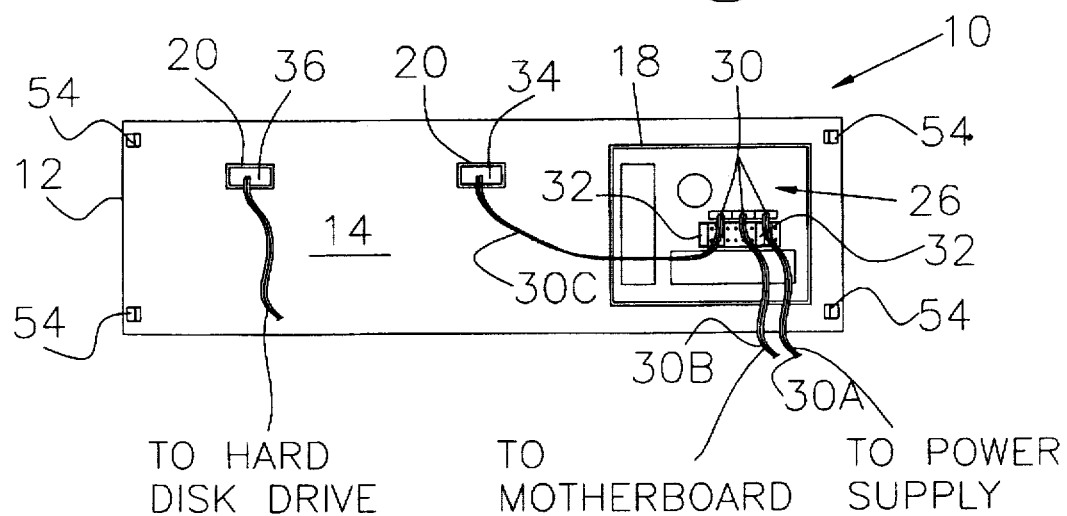
FIG. 4 is a rear elevation view of the removable/adjustable digital display accessory for computers illustrated in FIG. 2.

FIG. 4 illustrates the rear side of the accessory 10 illustrated in FIG. 3. Particularly of interest in FIG. 4 is the electrical connection of the digital display unit 26, the turbo indicator 34, and the hard disk drive indicator 36 to the computer 60. In the illustrated embodiment of the digital display unit 26 manufactured by Macase, a bank of three pairs of electrical connectors 30 is provided. The connector pair 30A is provided for electrical connection to a power source (not shown). Typically, the power source is the power supply of the computer 60. The connector pair 30B is provided for electrical connection to the motherboard (not shown) of the computer 60 for indication of the operation of the processor in "turbo" mode. The connector pair 30C is provided for electrical connection to the turbo indicator 34 carried by the base plate 12 for visual indication of the operation of the processor in "turbo" mode. The hard disk drive indicator 36 is connected directly to the hard disk drive to indicate when power is being delivered to the hard disk drive as indicated above.

Also incorporated in the digital display unit 26 is a bank of jumpers 32 for setting the processor speed. Depending upon the normal processor speed, at least one of the jumpers 32 is set such that the appropriate speed is displayed. Thus, when the processor is replaced with a processor of another speed, or when the accessory 10 is moved from one computer 60 to another with a processor operating at a different speed, the jumpers 32 are removed and replaced in the appropriate positions to again indicate the current processing speed of the processor.

Figure 5:
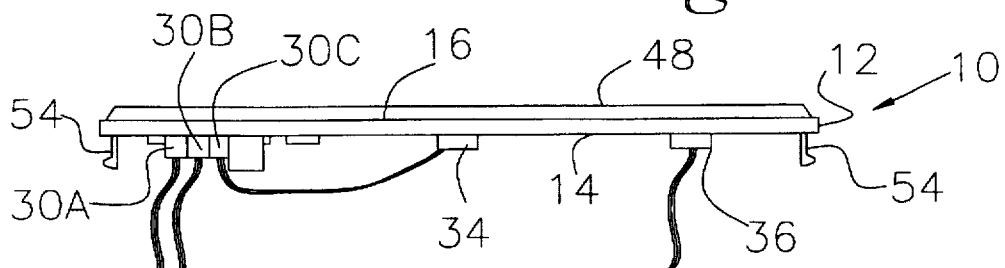
FIG. 5 is an side elevation view of the removable/adjustable digital display accessory for computers illustrated in FIG. 2.
Figure 6:
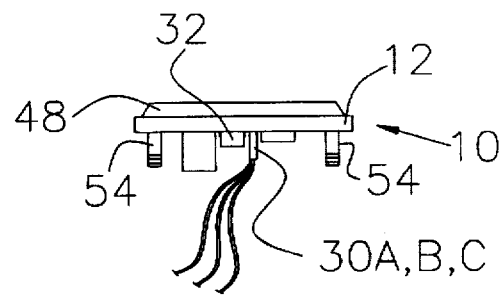
FIG. 6 is an end elevation view of the removable/adjustable digital display accessory for computers illustrated in FIG. 2.

FIGS. 5 and 6 illustrate a bottom elevation view and an end view, respectively, of the accessory illustrated in FIGS. 3 and 4. Of particular interest is the securement device provided for securing the accessory 10 to the cover 64 of the computer 60. In the illustrated embodiment, a pair of tabs 54 is carried by the base plate 12 at each end thereof. The tabs 54 are configured in a conventional manner to simulate the securement tabs carried by the cover plate 68 which is removed for replacement by the accessory 10. It will be understood, however, that other conventional methods may be used for securing the accessory 10 to the computer 60 or its cover 64.

Figure 7:
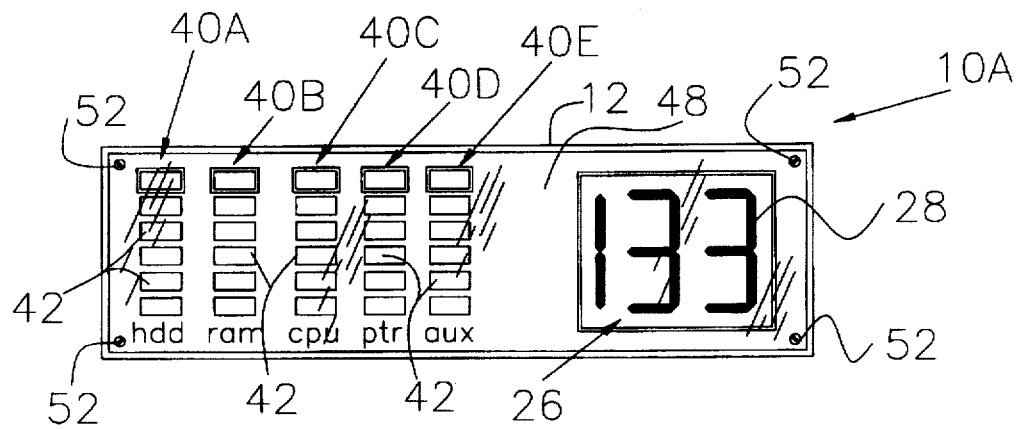
FIG. 7 is a front elevation view of a first alternate embodiment of the removable/adjustable digital display accessory for computers.
Figure 8:
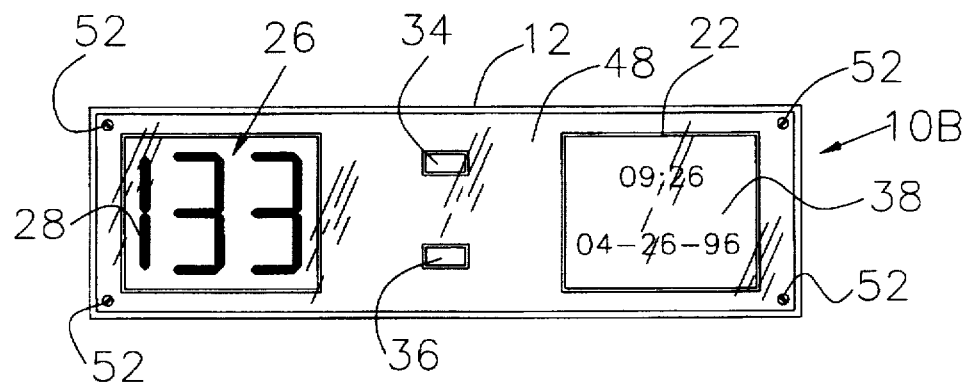
FIG. 8 is a front elevation view of a second alternate embodiment of the removable/adjustable digital display accessory for computers.
Figure 9:
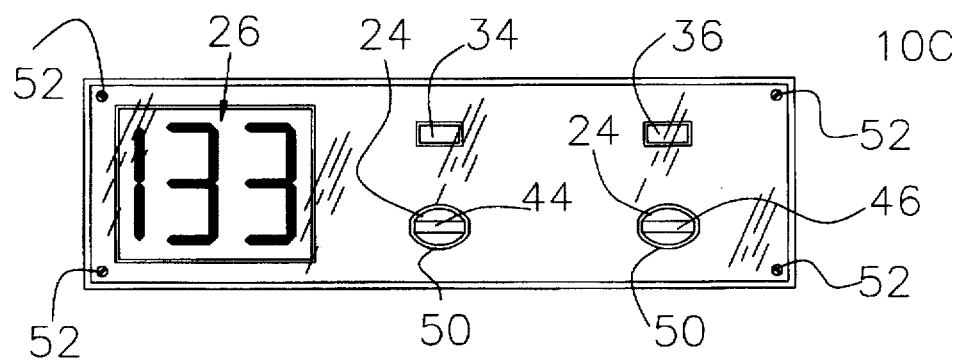
FIG. 9 is a front elevation view of a third alternate embodiment of the removable/adjustable digital display accessory for computers.

FIGS. 7-9 illustrate alternate embodiments of the accessory 10. In FIG. 7, the accessory 10A is further provided with a date and time clock 38 The base plate 12 further defines a clock opening 22 for receipt of the date and time clock therein 38 In the preferred embodiment, the date and time clock 38 is provided with a battery (not shown) such that continual display of the date and time is accomplished, regardless of the computer power supply being ON or OFF. In the event the battery becomes weak, the accessory 10 is easily removed for replacement of the battery. It is envisioned that the date and time clock 38 may be powered directly from the computer power supply, with backup power being derived from the computer backup battery (not shown).

FIG. 8 illustrates an accessory 10B having a plurality of signal strength indicators 40 for indicating the strength of the electrical signal being delivered to a like number of components. In the illustrated embodiment, five such signal strength indicators 40A-E are provided for indicating the signal strength of electrical current delivered to each of the hard disk drive, the RAM, the processor, a printer (not shown), and an auxiliary device, respectively. Each of the signal strength indicators 40A-E of the illustrated embodiment is comprised of a plurality of LED's 42 in series one with the other. The number of LED's 42 illuminated indicates the strength of the electrical signal being delivered to the associated component.

FIG. 9 illustrates an accessory 10C similar to that of FIGS. 3 and 4, with the addition of a reset switch 44 and a turbo switch 46. These switches 44,46 are connected to the computer 60 in conventional fashion. The reset switch 44 is used to restart the computer 60 without powering off the computer 60. The turbo switch 46 is used for toggling the "turbo" mode ON and OFF. Each of the reset and turbo switches 44,46 is carried by the base plate 12, the base plate 12 defining openings 24 for accessing the switches 44,46. The face plate 48 is further provided with openings 50 for accessing the reset and turbo switches 44,46.

From the foregoing description, it will be recognized by those skilled in the an that a removable/adjustable digital display accessory for computers offering advantages over the prior an has been provided. Specifically, the removable/adjustable digital display accessory for computers provides a means for displaying the current operating speed of the processor of a conventional computer. The accessory is configured to replace a cover plate associated with a computer cover, the cover plate otherwise coveting an empty drive bay.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A removable/adjustable digital display accessory for computers for displaying at least the current operating speed of a computer processor, the computer processor being associated with a computer housed within a case having a cover, the cover defining a plurality of openings for accessing a like number of drives, at least one of the openings being unused, said removable/adjustable digital display accessory for computers comprising:

a base plate adapted to be received within an unused opening defined by a cover of a computer case;

a digital display unit carried by said base plate and having a digital display for displaying a current processing speed of a computer processor associated with a computer housed within the computer case, said base plate defining a window though which is viewed said digital display;

a face plate carried by said base plate for covering said digital display, said face plate being fabricated from an at least translucent material; and a securement device carried by said base plate for removably securing said removable/adjustable digital display accessory to the cover of the computer case within the unused opening.

2. The removable/adjustable digital display accessory of claim 1 wherein said face plate is fabricated from a transparent material.

3. The removable/adjustable digital display accessory of claim 1 wherein said face plate is secured to said base plate using screw-type fasteners.

4. The removable/adjustable digital display accessory of claim 1 further comprising a turbo indicator carried by said base plate for indicating when the processor is operating in "turbo" mode, said base plate defining a turbo indicator opening for viewing said turbo indicator.

5. The removable/adjustable digital display accessory of claim 1 further comprising a hard disk drive indicator carried by said base plate for indicating when a hard disk drive associated with the computer is being accessed, said base plate defining a hard disk drive indicator opening for viewing said hard disk drive indicator.

6. The removable/adjustable digital display accessory of claim 1 further comprising a time and date clock carried by said base plate for continuously displaying the time and date, said base plate defining a time and date clock opening for viewing a face of said time and date clock.

7. The removable/adjustable digital display accessory of claim 6 wherein said time and date dock is provided with a battery for supplying power thereto.

8. The removable/adjustable digital display accessory of claim 1 further comprising a plurality of power level indicators for indicating an amount of electrical current being supplied to a plurality of devices associated with the computer, the devices being selected from the group consisting of a hard disk drive, RAM, the processor, and a printer.

9. The removable/adjustable digital display accessory of claim 1 further comprising a reset switch carried by said base plate for restarting the computer without requiring turning the power off from the computer, said base plate defining a base plate reset switch opening for accessing said reset switch, said face plate defining a face plate reset switch opening for accessing said reset switch.

10. The removable/adjustable digital display accessory of claim 1 further comprising a turbo switch carried by said base plate for toggling the processor "turbo" mode ON and OFF, said base plate defining a base plate turbo switch opening for accessing said turbo switch, said face plate defining a face turbo reset switch opening for accessing said turbo switch.

11. A removable/adjustable digital display accessory for computers for displaying at least the current operating speed of a computer processor, the computer processor being associated with a computer housed within a case having a cover, the cover defining a plurality of openings for accessing a like number of drives, at least one of the openings being unused, said removable/adjustable digital display accessory for computers comprising:

- a base plate adapted to be received within an unused opening defined by a cover of a computer case;
- a digital display unit carried by said base plate and having a digital display for displaying a current processing speed of a computer processor associated with a computer housed within the computer case, said base plate defining a window though which is viewed said digital display;
- a turbo indicator carried by said base plate for indicating when the processor is operating in "turbo" mode, said base plate defining a turbo indicator opening for viewing said turbo indicator;
- a hard disk drive indicator carried by said base plate for indicating when a hard disk drive associated with the computer is being accessed, said base plate defining a hard disk drive indicator opening for viewing said hard disk drive indicator;
- a face plate carried by said base plate for covering said digital display, said face plate being fabricated from an at least translucent material; and
- a securement device carried by said base plate for removably securing said removable/adjustable digital display accessory to the cover of the computer case within the unused opening.

12. The removable/adjustable digital display accessory of claim 11 wherein said face plate is fabricated from a transparent material.

13. The removable/adjustable digital display accessory of claim 11 wherein said face plate is secured to said base plate using screw-type fasteners.

14. The removable/adjustable digital display accessory of claim 11 further comprising a time and date clock carried by said base plate for continuously displaying the time and date, said base plate defining a time and date clock opening for viewing a face of said time and date clock.

15. The removable/adjustable digital display accessory of claim 14 wherein said time and date clock is provided with a battery for supplying power thereto.

16. The removable/adjustable digital display accessory of claim 11 further comprising a plurality of power level indicators for indicating an mount of electrical current being supplied to a plurality of devices associated with the computer, the devices being selected from the group consisting of a hard disk drive, RAM, the processor, and a printer, said turbo indicator and said hard disk drive indicator each being one of said plurality of power level indicators.

17. The removable/adjustable digital display accessory of claim 11 further comprising a reset switch carried by said base plate for restarting the computer without requiring turning the power off from the computer, said base plate defining a base plate reset switch opening for accessing said reset switch, said face plate defining a face plate reset switch opening for accessing said reset switch.

18. The removable/adjustable digital display accessory of claim 11 further comprising a turbo switch carried by said base plate for toggling the processor "turbo" mode ON and OFF, said base plate defining a base plate turbo switch opening for accessing said turbo switch, said face plate defining a face turbo reset switch opening for accessing said turbo switch.

19. A removable/adjustable digital display accessory for computers for displaying at least the current operating speed of a computer processor, the computer processor being associated with a computer housed within a case having a cover, the cover defining a plurality of openings for accessing a like number of drives, at least one of the openings being unused, said removable/adjustable digital display accessory for computers comprising:

- a base plate adapted to be received within an unused opening defined by a cover of a computer case;
- a digital display unit carried by said base plate and having a digital display for displaying a current processing speed of a computer processor associated with a computer housed within the computer case, said base plate defining a window though which is viewed said digital display;
- a plurality of power level indicators for indicating an amount of electrical current being supplied to a plurality of devices associated with the computer, the devices being selected from the group consisting of a hard disk drive, RAM, the processor, and a printer;
- a face plate carried by said base plate for covering said digital display, said face plate being fabricated from an at least translucent material; and
- a securement device carried by said base plate for removably securing said removable/adjustable digital display accessory to the cover of the computer case within the unused opening.

20. The removable/adjustable digital display accessory of claim 19 wherein said face plate is fabricated from a transparent material.

* * * * *